United States Patent
Leonard (10) Patent No.: US 8,185,912 B1
(45) Date of Patent: May 22, 2012

(54) REROUTING MESSAGES TO PARALLEL QUEUE INSTANCES

(75) Inventor: Mark Leonard, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 901 days.

(21) Appl. No.: 12/245,229

(22) Filed: Oct. 3, 2008

(51) Int. Cl.
 *G06F 9/50* (2006.01)
 *G06F 9/54* (2006.01)
 *G06F 13/38* (2006.01)
 *G06F 15/163* (2006.01)
 *G06F 11/00* (2006.01)

(52) U.S. Cl. ........ 719/314; 718/105; 709/226; 714/100; 714/1; 714/2; 714/3; 714/4.1; 714/4.11

(58) Field of Classification Search .................. None
See application file for complete search history.

(56) References Cited

U.S. PATENT DOCUMENTS

| | | | |
|---|---|---|---|
| 5,937,205 A * | 8/1999 | Mattson et al. | 710/6 |
| 6,035,424 A * | 3/2000 | Freerksen et al. | 714/40 |
| 2003/0182464 A1 * | 9/2003 | Hamilton et al. | 709/314 |
| 2006/0129684 A1 * | 6/2006 | Datta | 709/229 |

OTHER PUBLICATIONS

"Open VMS System Managers Manual", Mar. 2001, Compaq.*

* cited by examiner

*Primary Examiner* — Qing Wu (57) ABSTRACT

A method, system, and medium are provided for re-routing messages from a particular parallel queue instance that is experiencing below normal message throughput by lowering the priority setting of the particular queue instance. The messages are re-routed to the other parallel queue instances by a load balancing algorithm that transfers messages to queue instances having a higher priority setting. A series of determinations are made, prior to lowering the priority setting, to confirm that lowering the priority setting for the queue instance is the preferred response to the decreased throughput for the queue instance.

20 Claims, 5 Drawing Sheets

REROUTING MESSAGES TO PARALLEL QUEUE INSTANCES

SUMMARY

Embodiments of the invention are defined by the claims below. Embodiments of the invention temporarily cause messages to be routed away from a primary queue instance to other parallel queue instances by lowering the priority of the primary queue instance. Lowering the priority of the primary queue instance causes a load balancing algorithm to stop sending messages to the primary queue instance. Embodiments of the present invention have several practical applications in the technical arts including optimizing message delivery in a messaging-middleware environment. Specifically, one embodiment lowers the priority a queue instance in response to detecting a decreased throughput in the queue instance and upon determining a series of criteria are satisfied.

In a first illustrative embodiment, one or more computer-readable media having computer-executable instructions embodied thereon for performing a method of automatically lowering, for a primary queue instance, a priority setting that is used by a load balancing algorithm to distribute messages between a plurality of parallel queue instances that includes the primary queue instance are provided. The method includes retrieving characteristics of the primary queue instance including a number of messages entering the primary queue instance during a period of time, a number of messages exiting the primary queue instance during the period of time, and a number of application interfaces operating to remove the messages from the primary queue instance. The method also includes calculating a message throughput for the primary queue instance using the number of messages entering the primary queue instance and the number of messages exiting the primary queue instance. The method also includes determining that the message throughput is within a cautionary range bounded by an adequate throughput level and a low throughput level. The method further includes determining that the number of application interfaces operating is greater than a first threshold number of application interfaces. The method also includes determining that conditions associated with one or more parallel queue instances do not allow priority settings for the one or more parallel queue instances to be increased. A parallel queue instance and the primary queue instance facilitate transmission of a first type of message between a first program and a second program. The method also includes determining that the number of application interfaces operating on each of the one or more parallel queue instances is above a second threshold number of application interfaces. The method further includes, upon making the above determinations, decreasing the priority setting of the primary queue instance to a lower setting, thereby causing fewer messages to be sent to the primary queue instance.

In another illustrative embodiment, one or more computer-readable media having computer-executable instructions embodied thereon for performing a method of lowering a priority setting for a primary queue instance that has at least one parallel queue instance when message-throughput slow down is detected are provided. The method includes determining that the message throughput for the primary queue instance is within a cautionary range bounded by an adequate throughput level and a low throughput level. The method also includes determining that conditions associated with one or more parallel queue instances do not allow priority settings for the one or more parallel queue instances to be increased. A parallel queue instance and the primary queue instance facilitate transmission of a first type of message between a first program and a second program, and wherein the conditions include a present throughput of the one or more parallel queue instances within the cautionary range. The method also includes determining that a number of application interfaces operating on each of the one or more parallel queue instances is above a parallel-threshold number of application interfaces. The method further includes, upon making the above determinations, decreasing the priority setting of the primary queue instance to a lower setting, thereby causing fewer messages to be sent to the primary queue instance.

In a third illustrative embodiment, one or more computer-readable media having computer-executable instructions embodied thereon for performing a method of lowering a priority setting for a primary queue instance having a message throughput within a cautionary range are provided. The method includes receiving an instruction to lower the priority setting for the primary queue instance. The priority setting is used by a load balancing algorithm to distribute messages between a plurality of parallel queue instances that includes the primary queue instance. The method also includes determining that conditions associated with one or more parallel queue instances do not allow priority settings for the one or more parallel queue instances to be increased. A parallel queue instance and the primary queue instance facilitate transmission of a first type of message between a first program and a second program. The method includes determining that a number of application interfaces operating on each of the one or more parallel queue instances is above a parallel-threshold number of application interfaces. The method also includes, upon making the above determinations, decreasing the priority setting of the primary queue instance to a lower setting, thereby causing fewer messages to be sent to the primary queue instance.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Embodiments of the present invention will be better understood from the detailed description provided below and from the accompanying drawings of various embodiments of the invention, which describe, for example, rerouting messages from a queue with a lower than desired message throughput to other parallel instances of the queue. Throughout this description the queue with the low message throughput will be described as the primary queue instance. The other parallel instances of the queue may or may not also have low message throughput and have associated components performing the same methods in parallel. However, for the sake of simplicity the methods described herein will be described from the perspective of the primary queue instance and components associated with the primary queue instance. The detailed description and drawings, however, should not be read to limit the invention to the specific embodiments. Rather, these specifics are provided for explanatory purposes that help the invention to be better understood.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As stated above, the embodiments of the present invention may be, among other things: a method, system, or computer-program product that is implemented as software, hardware or a combination of the two, or as computer-readable media having computer-usable instructions embodied thereon. In these embodiments, an exemplary operating environment may be as simple as a single computing device. Examples of computing devices that may be suitable for use with the invention include, but are not limited to, personal computers, server computers, handheld or laptop devices, multiprocessor systems, microprocessor-based systems, set top boxes, programmable consumer electronics, network personal computers (PCs), minicomputers, and mainframe computers.

Figure 1:
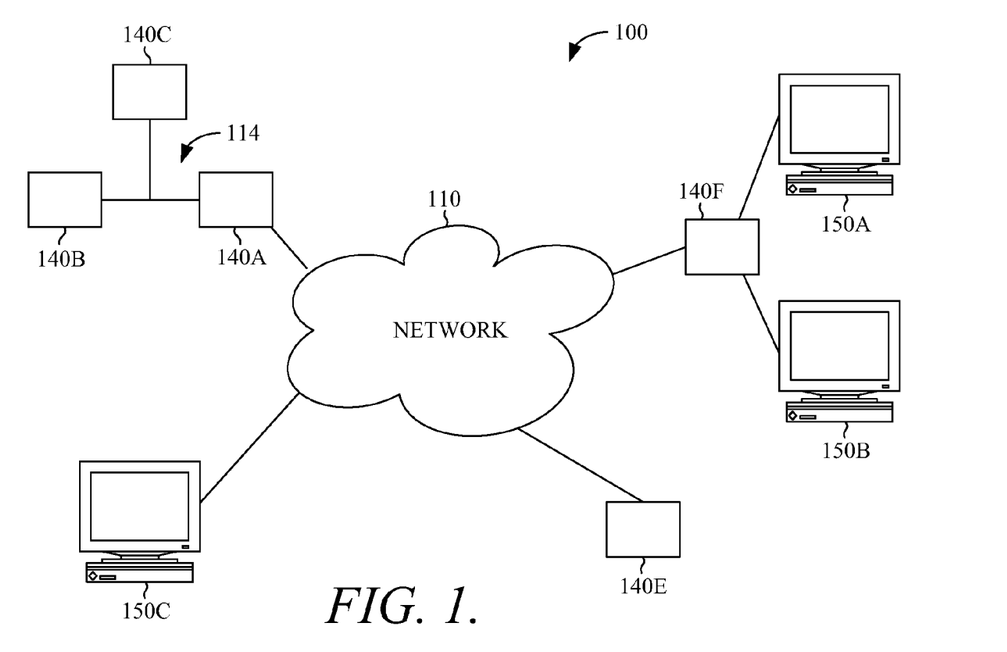
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C which communicate with each other via LAN 114, servers 140E and 140F all of which communicate with each other via network 110. Operating environment 100 is merely an example of one suitable networking environment and is not intended to suggest any limitation as to the scope of use or functionality of embodiments of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
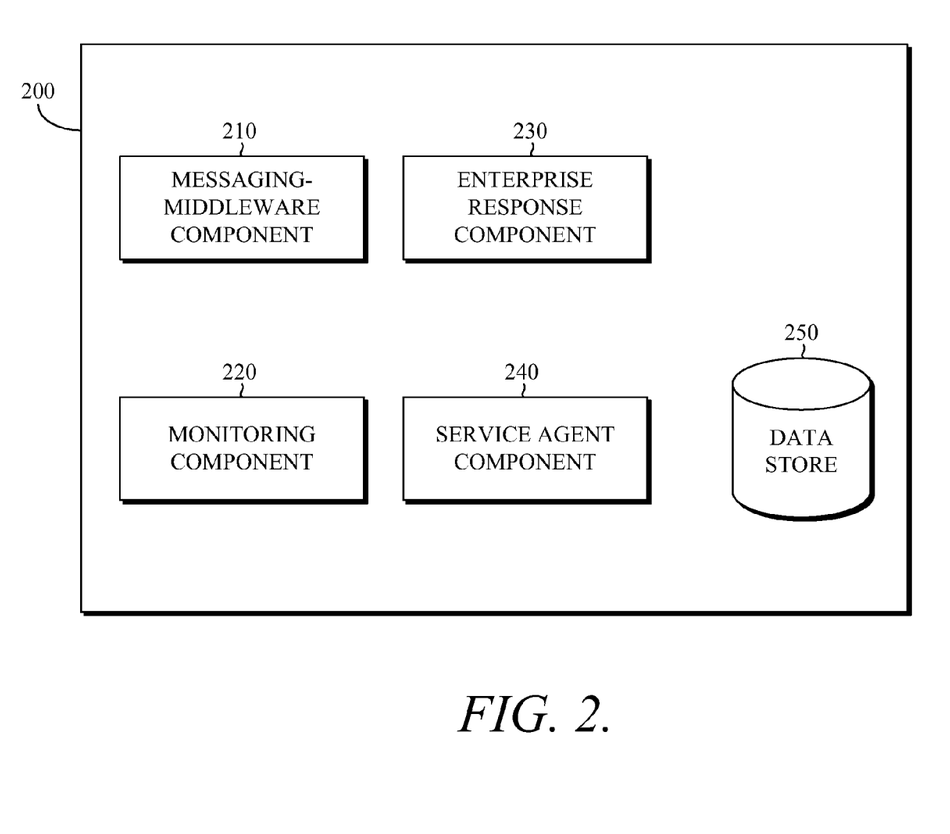
FIG. 2 is a drawing of an operating environment in which an embodiment of the present invention may be practiced.

Turning now to FIG. 2, a block diagram depicts an exemplary computing system architecture 200 suitable for automatically rerouting messages to parallel instances of a queue by lowering the priority of a primary instance of the queue. It will be understood and appreciated by those of ordinary skill in the art that the exemplary computing system architecture 200 shown in FIG. 2 is merely an example and is not intended to suggest any limitation as to the scope of the use or functionality of embodiments of the present invention. Neither should the exemplary computing system architecture 200 be interpreted as having any dependency or requirement related to any single component or combination of components illustrated therein.

Exemplary computing system architecture 200 includes a messaging-middleware component 210, a monitoring component 220, an enterprise response component 230, a service agent component 240 and data store 250. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging middleware applications (a.k.a message-oriented middleware) include IBM's WebSphere® MQ (formerly MQ Series®), Fiorano's MQ, Oracle Advanced Queuing (AQ), and Microsoft's MSMQ. The messaging-middleware component 210 can be any application that uses queues to transfer messages from one application to another. For example, information from a front end application is formed into one or more messages. These messages from the front end application are placed in a sending queue within the messaging-middleware component 210 and transferred into a receiving queue within the messaging-middleware component 210. A back end program retrieves the message from the receiving queue. The message is transmitted through channels within the messaging-middleware component 210. In this example, the front end program and the backend program could be located on any computing device communicatively coupled to the one or more computers on which the messaging-middleware component 210 resides. A messaging-middleware client may reside on both of the computing devices on which the front end and back end programs reside to allow interaction with the messaging-middleware component 210.

The messaging-middleware component 210 may manage thousands of queues. In one embodiment, the messaging-middleware component 210 operates in parallel with secondary messaging-middleware components (not shown) containing additional instances of the queues managed by the messaging-middleware component 210. As described previously a queue transfers messages between two programs. Parallel queue instances transfer the same type of message between the same two programs, but are managed by separate messaging-middleware components. Thus, if eight messaging-middleware components were operating in parallel, then eight parallel queue instances would exist. One instance would be in each of the eight messaging-middleware components. In this application, the primary queue instance is one of the parallel queue instances that embodiments of the present invention evaluate to determine if the priority setting assigned to the primary queue instance should be lowered. As mentioned previously, the same method may be performed on each of the parallel queue instances.

Messages may be distributed between the parallel queue instances using a load balancing algorithm that distributes messages in a round-robin fashion. In one embodiment, the amount of messages sent to each parallel queue instance is about equal over time if the priority of each queue is the same. Lowering the priority setting associated with a queue causes the load balancing algorithm to send fewer messages to the queue. Under some network conditions, applications that use a load balancing algorithm to distribute messages between parallel queue instances may stop sending messages to a queue instance having a lower priority. Lowering the priority setting does not take the queue offline.

The queues within the messaging-middleware component 210 are described by a series of attributes. Each attribute has an associated value or setting. For example, one attribute could be a queue name and the associated setting could be "SprintBillinginfo1." Some attributes are preset, while other attributes measure current conditions within the queue and change over time. For example, the queue name attribute is preset, but the current queue depth attribute changes based on the number of messages in the queue. Queue depth is a measure of data in the queue at a particular point in time. Throughout this disclosure preset attributes will be associated with settings, and attributes that are based on queue conditions are associated with attribute values. The primary attribute settings and values that are involved in embodiments of the present invention include a message-in value, a message-out value, a reset time interval setting, an active application interface value, and a priority setting. Many other attributes may be used to describe a queue and may be accessed or modified in embodiments of the present invention.

The above mentioned attributes and settings are related to the amount of information or data entering and leaving a queue. The amount of information entering or leaving a queue may be measured in a variety of units of measure including the number of messages or bytes of data. Throughout this description the amount of information will be described in terms of messages, but embodiments of the invention are not intended to be limited to measuring the information entering and leaving a queue in terms of messages. A queue has a capacity to hold a limited amount of information, which may be referred to as the maximum queue depth. The maximum allowable depth setting is the maximum amount of information the queue can hold before incoming messages are turned away. The current depth value is the current amount of information in the queue.

The message-in value is the amount of messages that have entered the queue since the start of a reset period. Once the time period is reset, the message-in value is reset to zero and increases with each message that enters the queue. The message-out value is the amount of messages that have exited the queue since the reset period started. The reset time interval value is the time period after which the message-in value and the message-out value are reset to zero. In one embodiment, the message-in value is called the enqueue rate and the message-out value is called the dequeue rate. The priority setting is used by sending components associated with the messaging middleware queues to balance loads between parallel queue instances.

Monitoring component 220 is configured to monitor messaging-middleware objects (e.g., channels and queues) for upset conditions that may require corrective actions. Examples of commercially available monitoring components include HP Openview®, Q Pasa!® by MQSoftware, Candle's PathWAI, and BMC Patrol. The monitoring component 220 may retrieve, store, and evaluate queue values periodically to ascertain whether an upset condition is present. For example, the current depth of the queue could be retrieved periodically. Having retrieved one or more attribute values, the one or more attribute values may be evaluated against threshold values within the monitoring component 220. The monitoring component 220 may generate an alarm or incident message if attribute values are outside of normal operating conditions. The monitoring component 220 may perform one or more calculations with the one or more attribute values to arrive at a value that is compared against a threshold. For example the monitoring component 220 may calculate the message throughput by dividing the outgoing messages during a period of time by the incoming messages during the period of time. The message throughput may then be compared against a threshold throughput and an incident message generated if the message throughput is within a cautionary range. In one embodiment, an incident message is generated if the message throughput is within a cautionary range, such as 50% to 75% throughput.

The monitoring component 220 is also configured to generate and transmit notifications describing potential problems within a queue. A problem may be indicated when one or more attribute values or calculated values fall outside of a normal operating range. In one embodiment, the information about the potential problem is transmitted to enterprise response component 230. In another embodiment, the monitoring component 220 directly notifies a designated responder or service agent component 240 about the potential problem.

Enterprise response component 230 is configured to coordinate a response to a problem detected in a queue. The enterprise response component 230 may receive information regarding a malfunction from a monitoring component 220 or another source. Upon receiving notification of a malfunction, the enterprise response component 230 may page a designated responder to investigate the upset condition. A designated responder may be an individual person or group of people given responsibility to fix upset conditions within certain queues. In another embodiment, the designated responder may be a computer application that takes corrective actions, such as service agent component 240. In an embodiment of the present invention, upon receiving an indication that message throughput is within a cautionary range, the enterprise response component 230 instructs the service agent component 240 to lower the priority setting of the primary queue instance if a series of conditions are satisfied. In some configurations, lowering the priority setting of the primary queue instance causes messages to be routed away from the specific queue instance toward other parallel queue instances. The priority may be increased again when the message throughput increases above the cautionary range.

As stated, service agent component 240 lowers the priority setting of the primary queue instance upon making a series of determinations indicating that lowering the priority setting of the queue instance is the appropriate response to the decreased throughput in the queue instance. In one embodiment, the lower throughput is detected by monitoring component 220. As described previously, the monitoring component 220 may monitor the throughput of a queue instance. The throughput is the percentage of messages entering the queue during a period of time that leave the queue during the period of time. If the throughput is within a cautionary range, the monitoring component 220 may generate an incident alarm and forward it to the enterprise response component 230. The cautionary range may be defined to reflect conditions to which lowering the priority of the primary queue is a desirable response. Lowering the priority of the queue may help avoid a disruption while a minor problem with a queue instance is resolved. In one embodiment, the cautionary range is between 50% and 75% of normal message throughput. However, the cautionary range will vary from application to application. Thus, embodiments of the present invention are not limited to the 50% to 75% range.

In another embodiment, the monitoring component 220 directly instructs the service agent component 240 to begin the process of determining whether lowering the priority setting for the queue instance is the appropriate response to the incident. In another embodiment, if the enterprise response component 230 receives the incident message first, the enterprise response component 230 may send a request back to the monitoring component 220 to generate an instruction for the service agent component 240 to begin a determination of whether lowering the priority setting for the queue is the appropriate response to the decreased throughput. In yet another embodiment, enterprise response component 230 may send an instruction directly to the service agent component 240 instructing it to begin the process of determining whether lowering the priority setting for the queue instance is the appropriate response to the decreased throughput in the queue instance. Other methods of instructing the service agent component 240 are also possible.

Upon receiving an instruction to determine if the priority setting in the primary queue instance should be lowered, the service agent component 240 makes a series of determinations. Embodiments of the invention are not dependent upon the order in which the determinations are made. If the service agent component 240 is unable to make any of the determinations then the priority setting for primary queue instance is not lowered. The service agent component 240 determines whether the throughput in the primary queue instance is within the cautionary threshold range. The cautionary range used to trigger the initial alarm may be derived based on historical performance data for the queue instance. In general, the cautionary range should cover a performance area where the throughput is less than expected under normal operating, but more than expected if a serious problem with the primary queue instance were present. In one embodiment, the throughput threshold range is 50% to 75%. With such a range, above 75% throughput would be expected in normal operations, while less than 50% throughput indicates a serious problem with the queue instance. As will be explained in more detail, temporarily lowering the priority of the primary queue instance allows minor queue depth problems to be resolved before other queue depth related alarms are generated.

The service agent component 240 may directly interact with the messaging-middleware component 210 to retrieve the message-in value and the message-out value for the primary queue instance. The message-in and message-out values are used to determine the current throughput. As described previously, the throughput is measured over a period of time such as one minute or two minutes. Other periods of time may also be utilized. Making this determination confirms the initial incident message is accurate and that the conditions causing decreased throughput still exist. If the throughput is greater than or less than the cautionary range then the priority setting for the primary queue instance is not lowered. If the throughput remains in the cautionary range, additional determinations are made.

The service agent component 240 also determines whether greater than a threshold number of application interfaces are operating to remove messages from the primary queue instance. Application interfaces are programs associated with individual queue instances that transfer messages from the queue instance to a receiving application. The receiving application is the intended destination for the messages and receives messages from the queue instance. If less than a threshold number of application interfaces are operating, the service agent component 240 may increase the number of application interfaces operating in association with the primary queue instance in an effort to increase the primary queue instance's throughput. After adding additional application interfaces, the service agent component 240 re-computes the throughput of the queue instance to determine if the throughput is still within the cautionary range. If the throughput is still within the cautionary range, additional application interfaces may be added. In one embodiment, the service agent component 240 adds application interfaces and rechecks the throughput until either the throughput is greater than the cautionary range or the number of application interfaces operating is equal to or greater than the threshold number. In one embodiment, the threshold number of application interfaces is the maximum number of application interfaces able to effectively operate in association with the queue instance. Upon determining that the throughput is within the cautionary range and greater than a threshold number of application interfaces are running, the service agent component 240 proceeds to make additional determinations.

Service agent component 240 determines whether any of the other parallel queue instances have lower priority settings than the primary queue instance. If any of the parallel queue instances have lower priority settings, the service agent component 240 requests that the priority setting for a parallel queue instance having a lower setting be raised. The service agent component 240 may communicate this request to a service agent component associated with the parallel queue instance. The service agent associated with the parallel queue instance may then evaluate conditions associated with the parallel queue instance to determine if the priority setting associated with the parallel queue instance may be raised. For example, the service agent component associated with the parallel queue instance may evaluate the message throughput. If the message throughput is within a cautionary range, the service agent component for the parallel queue instance may reply to service agent component 240 indicating that the priority setting may not be raised. On the other hand, the service agent component for the parallel queue instance may indicate that the priority setting may be raised. If the priority setting for one or more of the parallel queue instances is raised, the service agent component 240 may re-evaluate the message throughput for the primary queue instance after a period of time. Raising the priority of the other parallel queue instance will cause more messages to go to the parallel queue instance and fewer messages should go to the primary queue instance. Thus, this may improve the percentage throughput of the primary queue instance by sending fewer messages to the primary queue instance. If the message throughput of the primary queue instance continues to be within the cautionary range, subsequent determinations should be made. If, on the other hand, the throughput for the primary queue instance is above the cautionary range after the priority settings for one or more parallel queue instances are raised, then no further determinations need be made and the process may stop. In fact, at any point during the determinations described herein, when the throughput for the primary queue instance is determined to be above the cautionary range, the determination as to whether the priority should be lowered may be terminated.

Service agent component 240 determines whether each of the parallel queue instances have above a threshold number of application interfaces running. If one or more of the parallel queue instances has less than the threshold amount of application interfaces running, the service agent component 240 requests that the service agent associated with the parallel queue instance increase the number of application interfaces running in association with the parallel queue instance. Like increasing the priority, which was described above, increasing the application interfaces running on the parallel queue instances may result in fewer messages being sent to the primary queue instance. Sending fewer messages to the primary queue instance may increase the percentage throughput of the primary queue instance above the cautionary range. Once each of the parallel queue instances has above the threshold number of application interfaces running, the service agent component 240 may re-evaluate the message throughput for the primary queue instance to determine if the message throughput is still within the cautionary range. If the throughput of the primary queue instance is no longer in the cautionary range, then the service agent component 240 may not lower the priority setting associated with the primary queue instance.

Upon making the previously described determinations, specifically that the application interfaces running in association with the primary queue instance is above a threshold number, that parallel queue instances cannot increase their priority level and that parallel queue instances each are running above the threshold number of application interfaces, then the service agent component 240 lowers the priority of the primary queue instance. As described previously, the priority of the primary queue instance may be an attribute associated with the primary queue instance. In one embodiment, the priority of the primary queue instance is lowered a single level. The service agent component 240 may periodically re-evaluate the message throughput of the primary queue instance. When the primary queue instances message throughput increases to above the cautionary range, the service agent component 240 may increase the priority setting for the primary queue instance.

The data store 250 is configured for storing information related to a queue including historical performance data and queue settings. Information in the data store 250 may be accessed by the service agent component 240, enterprise response component 230, and monitoring component 220.

Figure 3:
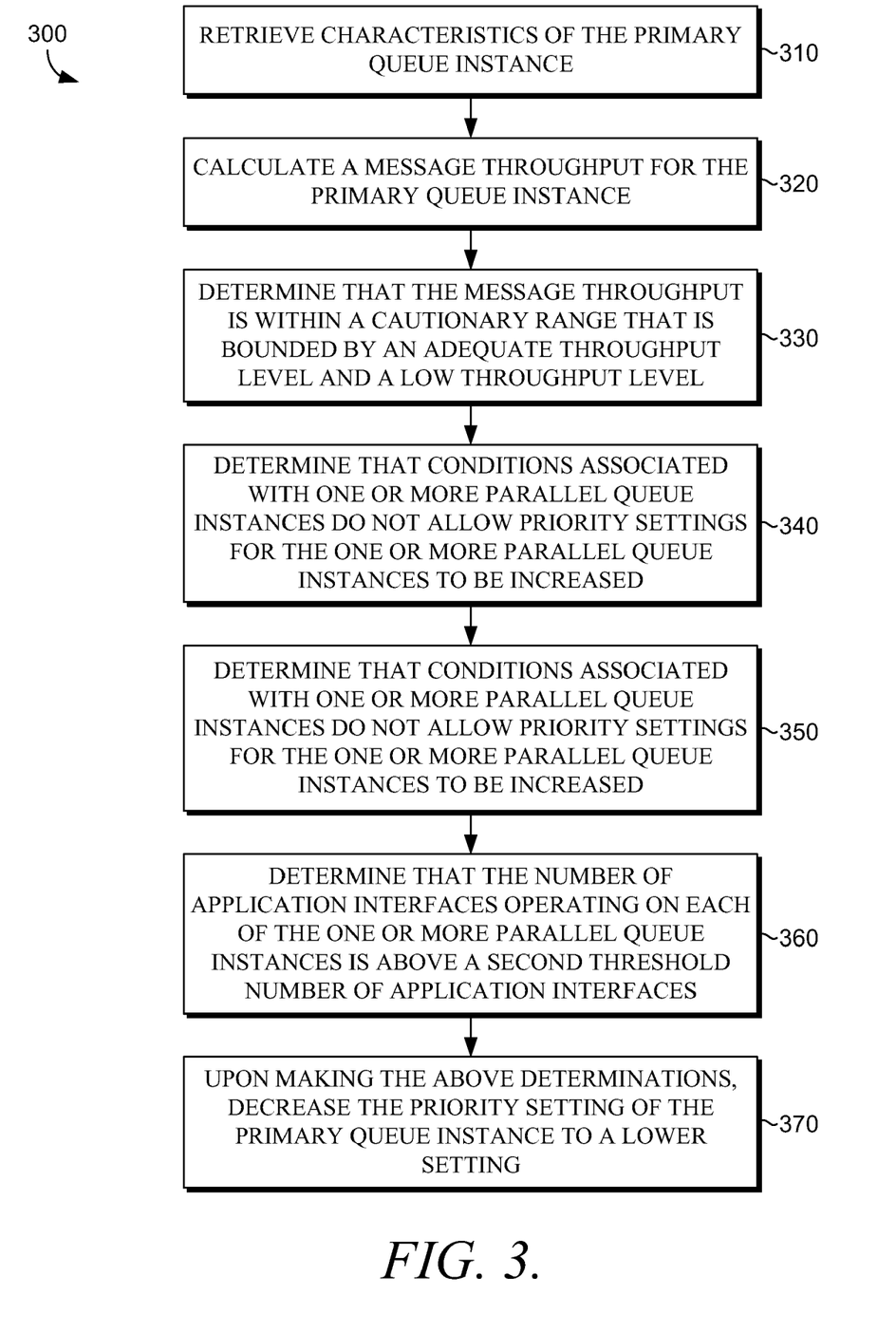
FIG. 3 is a flow diagram in which a method of automatically lowering, for a primary queue instance, a priority setting that is used by a load balancing algorithm to distribute messages between a plurality of parallel queue instances that includes the primary queue instance is described according to an embodiment of the present invention.

Turning now to FIG. 3, a method of automatically lowering, for a primary queue instance, a priority setting that is used by a load balancing algorithm to distribute messages between a plurality of parallel queue instances that includes the primary queue instance is shown, according to an embodiment of the present invention. A primary queue instance and parallel queue instances have been described previously. At step 310, characteristics of the primary queue instance are received. The characteristics include a number of messages entering the primary queue instance during a period of time, a number of messages exiting the primary queue instance during the period of time, and a number of application interfaces operating to remove the messages from the primary queue instance. The number of messages entering and exiting the primary queue instance may be retrieved from values tracked in a messaging middleware system.

At step 320, a message throughput is calculated for the primary queue instance using the number of messages entering the primary queue instance and the number of messages exiting the primary queue instance. The throughput may be expressed as a percentage of the messages entering the queue instance that leave the queue instance during a period of time. In another embodiment, the throughput could be expressed as the difference between the messages entering and exiting the primary queue instance during a period of time.

At step 330, the message throughput is determined to be within a cautionary range. The cautionary range is bounded by an adequate throughput level and a low throughput level. The adequate throughput level may be less than the maximum throughput level, but is deemed to be within normal operating parameters. The low throughput level is less than would be expected as normal operating conditions but above the throughput expected if a catastrophic problem had occurred within the primary queue instance. In other words, the cautionary range may indicate minor problems within the primary queue instance. As described previously, in one embodiment the cautionary range is between an adequate throughput level of 75% and a low throughput level of 50%. Where the throughput is measured as the difference between the messages entering and exiting the primary queue instance during a period of time the range could be between a first difference and a second difference. For example, the cautionary range could between a difference of five messages and 15 messages.

At step 340, the number of application interfaces operating to remove messages from the primary queue instance is determined to be greater than a first threshold number of application interfaces. The number of application interfaces operating may be retrieved from an attribute value associated with the primary queue instance. In one embodiment, the attribute value describing the number of application interfaces operating is described as the input process count attribute. Application interfaces have been described previously, but in brief they are used to transfer messages out of the primary queue instance and into a receiving queue associated with a receiving application. The number of application interfaces operating may be increased during periods of heavy message traffic and decreased during periods of low message traffic.

At step 350, conditions associated with the one or more parallel queue instances are determined not to allow priority settings for the one or more parallel queue instances to be increased. As described previously, the parallel queue instances and the primary queue instances facilitate transmission of a first type of message between a first program and a second program. Conditions that would not allow a lower priority setting of a parallel queue instance to be increased include the throughput of the parallel queue instance being within the cautionary range.

At step 360, the number of application interfaces operating on each of the one or more parallel queue instances is determined to be above a second threshold number of application interfaces. The first and second threshold number of application interfaces may be the same or different. In one embodiment, if each of the one or more parallel queue instances does not have above the threshold number of application interfaces operating, then a message is sent to the application interfaces having below the threshold number of application interfaces running requesting that they increase the number of application interfaces running to the second threshold number of application interfaces. As described previously, the message throughput of the primary queue instance may be re-evaluated to determine if it is still within the cautionary range after additional application interfaces have been brought online within the one or more parallel queue instances.

At step 360, upon making the above determinations, the priority setting of the primary queue instance is decreased to a lower setting. This causes less of the messages to be sent to the primary queue instance thereby decreasing the probability of a delay or disruption in the transfer of messages between a first and second program. The priority setting for the primary queue instance may be increased upon a further determination that the message throughput is no longer within the cautionary range.

Figure 4:
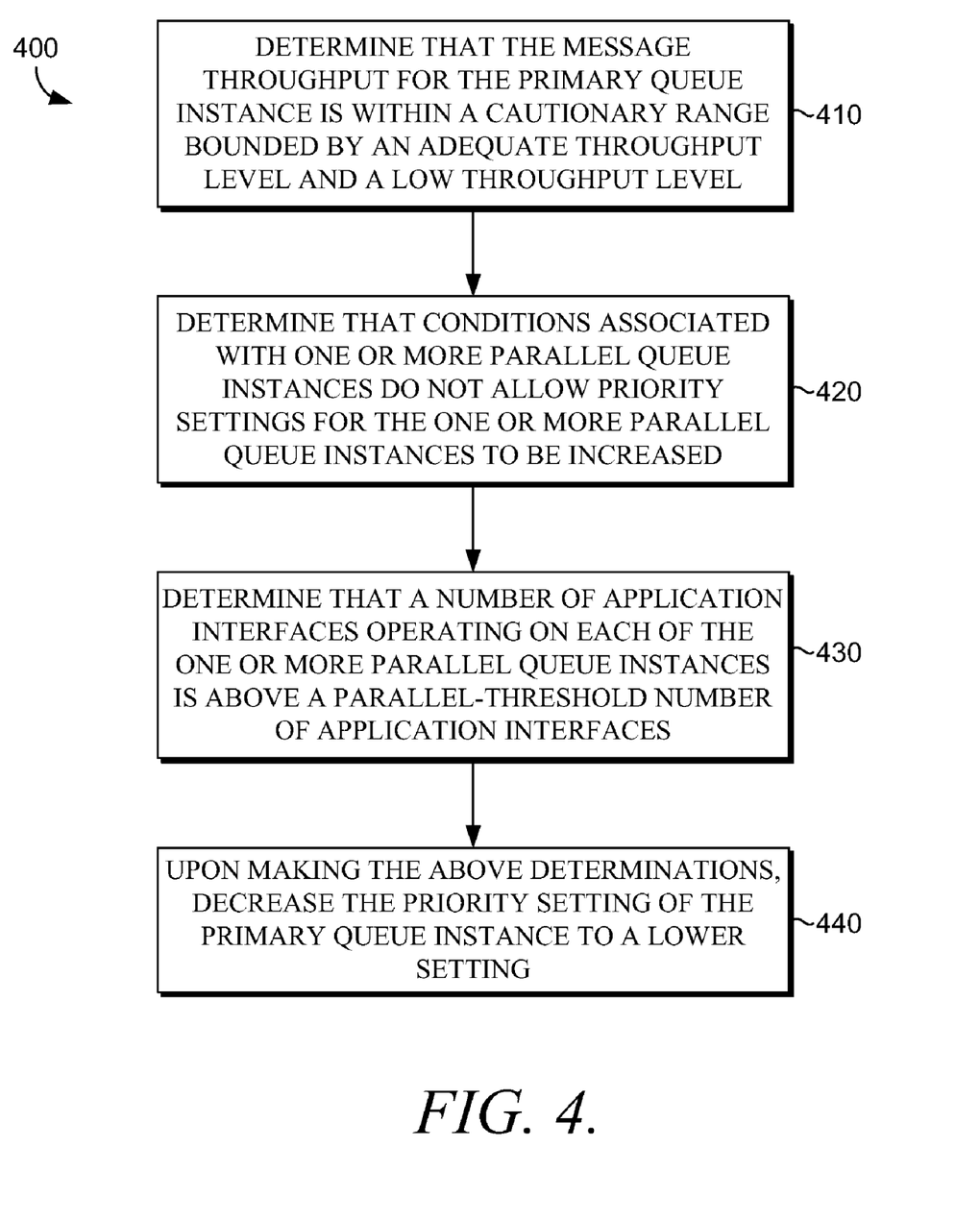
FIG. 4 is a flow diagram in which a method of lowering a priority setting for a primary queue instance that has at least one parallel queue instance when message-throughput slow down is detected is described according to an embodiment of the present invention.

Turning now to FIG. 4, a method of lowering a priority setting for a primary queue instance that has at least one parallel queue instance when a message-throughput slow down is detected is shown, in accordance with an embodiment of the present invention. At step 410, the message throughput for the primary queue instance is determined to be within a cautionary range bounded by an adequate throughput level and a low throughput level. A cautionary range, as well as an adequate throughput level and a low throughput level, have been explained previously with reference to FIG. 3.

At step 420, conditions associated with one or more parallel queue instances are determined not to allow priority settings for the one or more parallel queue instances to be increased. As explained previously, the parallel queue instances may not be increased if they are within the cautionary throughput range. At step 430, a number of application interfaces operating on each of the one or more parallel queue instances is determined to be above a parallel threshold number of application interfaces. As described previously, a request may be made to increase the number of application interfaces operating on one or more parallel queue instances if they are not presently at, or above, the parallel-threshold number of application interfaces.

At step 440, upon making the above determinations, the priority setting of the primary queue instance is decreased to a lower setting. The lower setting causes fewer messages to be sent to the primary queue instance. As described previously, fewer messages are sent when a lower priority setting is assigned to the primary queue instance because a load balancing algorithm takes the priority setting into account when distributing messages between a plurality of parallel queue instances.

Figure 5:
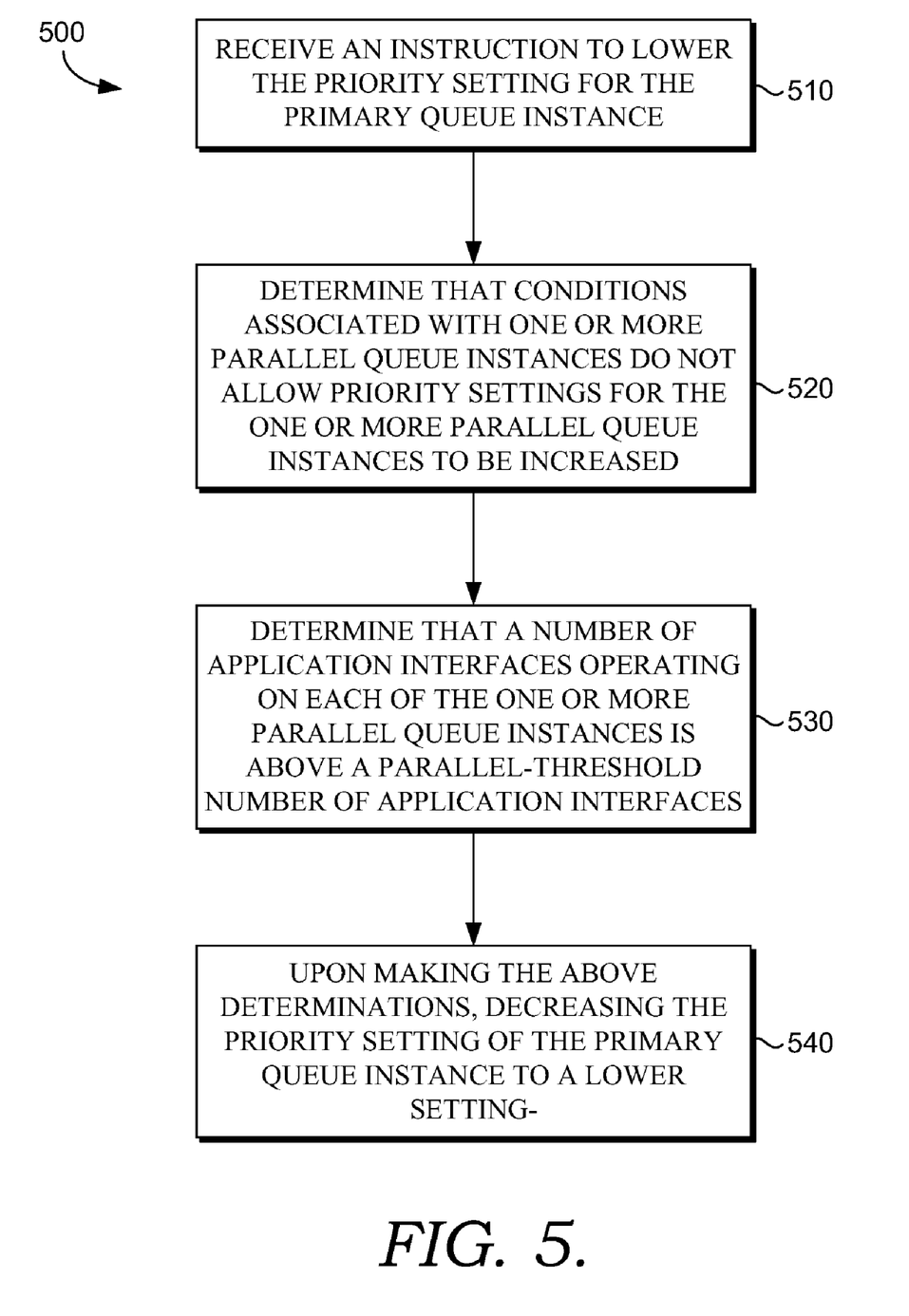
FIG. 5 is a flow diagram in which a method of lowering a priority setting for a primary queue instance having a message throughput within a cautionary range is described according to an embodiment of the present invention.

Turning now to FIG. 5, a method of lowering a priority setting for a primary queue instance having a message throughput within a cautionary range is shown, in accordance with an embodiment of the present invention. At step 510, an instruction to lower the priority setting for the primary queue instance is received. The instruction may be generated by an enterprise response component 230, such as enterprise response component 230, or monitoring agent, such as monitoring component 220. As described previously, the priority setting is used by a load balancing algorithm to distribute messages between a plurality of parallel queue instances that includes the primary queue instance.

At step 520, conditions associated with one or more parallel queue instances are determined not to allow priority settings for the one or more parallel queue instances to be increased. In one embodiment, the priority setting associated with the parallel queue instances is not increased when the priority settings are each on the highest priority setting already. In another embodiment, the priority settings are not increased because the parallel queue instance has a present message throughput within the cautionary range.

At step 530, a number of application interfaces operating on each of the one or more parallel queue instances is determined to be above a parallel threshold number of application interfaces. As described previously, a request may be sent to one or more parallel queue instances directing them to increase the number of application interfaces running on the parallel queue instances. The determination at step 530 may be made after the request to increase the number of application interfaces operating has been made. At step 540, upon making the above determinations, the priority setting of the primary queue instance is decreased to have a lower setting. As explained previously, this allows fewer messages to be sent to the primary queue instance and avoids a disruption of the message transfers between programs.

Many different arrangements of the various components depicted, as well as components not shown, are possible without departing from the spirit and scope of embodiments of the present invention. Embodiments of the present invention have been described with the intent to be illustrative rather than restrictive. It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of automatically lowering, for a primary queue instance, a priority setting that is used by a load balancing algorithm to distribute messages between a plurality of parallel queue instances that includes the primary queue instance, the method comprising:

retrieving characteristics of the primary queue instance including a number of messages entering the primary queue instance during a period of time, a number of messages exiting the primary queue instance during the period of time, and a number of application interfaces operating to remove the messages from the primary queue instance;

calculating a message throughput for the primary queue instance using the number of messages entering the primary queue instance and the number of messages exiting the primary queue instance;

determining that the message throughput is within a cautionary range bounded by an adequate throughput level and a low throughput level;

determining that the number of application interfaces operating is greater than a first threshold number of application interfaces;

determining that conditions associated with one or more parallel queue instances do not allow priority settings for the one or more parallel queue instances to be increased, and wherein a parallel queue instance and the primary queue instance facilitate transmission of a first type of message between a first program and a second program;

determining that the number of application interfaces operating on each of the one or more parallel queue instances is above a second threshold number of application interfaces; and upon making the above determinations, decreasing the priority setting of the primary queue instance to a lower setting, thereby causing fewer messages to be sent to the primary queue instance.

2. The media of claim 1, wherein the number of application interfaces operating to remove the messages from the primary queue instance is determined by reading an input process count attribute value for the primary queue instance.

3. The media of claim 1, wherein the adequate throughput level is 75% of a normal throughput and the low throughput level is 50% of the normal throughput.

4. The media of claim 1, wherein the method further comprises requesting that at least one parallel queue instance increases the priority setting associated with the at least one parallel queue instance.

5. The media of claim 1, wherein the method further comprises requesting that at least one of the one or more parallel queue instances increase the number of application interfaces operating to remove the messages from at least one of the one or more parallel queue instances.

6. The media of claim 1, wherein the method further includes increasing the number of application interfaces operating in association with the primary queue instance until the first threshold number of application interfaces is reached.

7. The media of claim 1, wherein the conditions associated with the one or more parallel queue instances that do not allow the priority settings for the one or more parallel queue instances to be increased include a present throughput of the one or more parallel queue instances within the cautionary range.

8. One or more non-transitory computer-readable media having computer-executable instructions embodied thereon for performing a method of lowering a priority setting for a primary queue instance that has at least one parallel queue instance when message-throughput slow down is detected, the method comprising:

determining that the message throughput for the primary queue instance is within a cautionary range bounded by an adequate throughput level and a low throughput level;

determining that conditions associated with one or more parallel queue instances do not allow priority settings for the one or more parallel queue instances to be increased, and wherein a parallel queue instance and the primary queue instance facilitate transmission of a first type of message between a first program and a second program, and wherein the conditions include a present throughput of the one or more parallel queue instances within the cautionary range;

determining that a number of application interfaces operating on each of the one or more parallel queue instances is above a parallel-threshold number of application interfaces; and upon making the above determinations, decreasing the priority setting of the primary queue instance to a lower setting, thereby causing fewer messages to be sent to the primary queue instance.

9. The media of claim 8, wherein determining that the message throughput for the primary queue instance is within the cautionary range includes:

receiving a number of messages that entered the primary queue instance during a time period;

receiving a number of messages that existed the primary queue instance during the time period;

calculating the message throughput percentage by dividing the number of messages that exited the primary queue instance by the number of messages that entered the primary queue instance; and comparing the message throughput percentage with the cautionary range.

10. The media of claim 8, wherein determining that greater than the parallel-threshold number of application interfaces are operating to remove the messages from each of the one or more parallel queue instances includes:

retrieving an attribute value associated with each of the one or more parallel queue instances that indicates how many application interfaces are operating to remove the messages from said each of the one or more parallel queue instances; and comparing the attribute value with the parallel-threshold number of application interfaces.

11. The media of claim 8, wherein the method further comprises requesting that at least one parallel queue instance increase the priority setting associated with the at least one parallel queue instance.

12. The media of claim 8, wherein the method further comprises requesting that at least one parallel queue instance increase the number of application interfaces operating to remove the messages from the at least one parallel queue instance.

13. The media of claim 12, wherein the method further includes:

activating additional application interfaces for the primary queue instance until a threshold number of application interfaces is reached; and determining that the threshold number of application interfaces are operating to remove the messages from the primary queue instance.

14. One or more non-transitory computer-readable media having computer-executable instructions embodied thereon for performing a method of lowering a priority setting for a primary queue instance having a message throughput within a cautionary range, the method comprising:

receiving an instruction to lower the priority setting for the primary queue instance, wherein the priority setting is used by a load balancing algorithm to distribute messages between a plurality of parallel queue instances that includes the primary queue instance;

determining that conditions associated with one or more parallel queue instances do not allow priority settings for the one or more parallel queue instances to be increased, and wherein a parallel queue instance and the primary queue instance facilitate transmission of a first type of message between a first program and a second program;

determining that a number of application interfaces operating on each of the one or more parallel queue instances is above a parallel-threshold number of application interfaces; and upon making the above determinations, decreasing the priority setting of the primary queue instance to a lower setting, thereby causing fewer messages to be sent to the primary queue instance.

15. The media of claim 14, wherein the method further includes comparing the number of application interfaces that are operating to remove the messages from the primary queue instance with a threshold number;

(1) if the number of application interfaces is less than the threshold number, then activating an additional application-interface instance and determining if the message throughput for the primary queue instance is in the cautionary range, (2) if the message throughput is still in the cautionary range, then activating additional application interfaces until the number of application interfaces that are operating reaches the threshold number or the message throughput for the primary queue instance is greater than the cautionary range.

16. The media of claim 14, wherein the conditions associated with the one or more parallel queue instances include a present throughput of the one or more parallel queue instances within the cautionary range.

17. The media of claim 14, wherein the method further comprises requesting that at least one parallel queue instance increase the number of application interfaces operating to remove the messages from the at least one parallel queue instance.

18. The media of claim 14, wherein determining that the number of application interfaces operating to remove the messages from the primary queue instance includes retrieving an attribute value from a queue manager that indicates the number of application interfaces operating in association with the primary queue instance.

19. The media of claim 14, wherein the cautionary range is bounded by an adequate throughput level and a low throughput level.

20. The media of claim 14, wherein the conditions associated with the one or more parallel queue instances includes each of the one or more parallel queue instances having the priority setting equal to the priority setting associated with the primary queue instance.

* * * * *